FLUID SIGNAL RESONATOR CONTROLS
Filed May 19, 1965
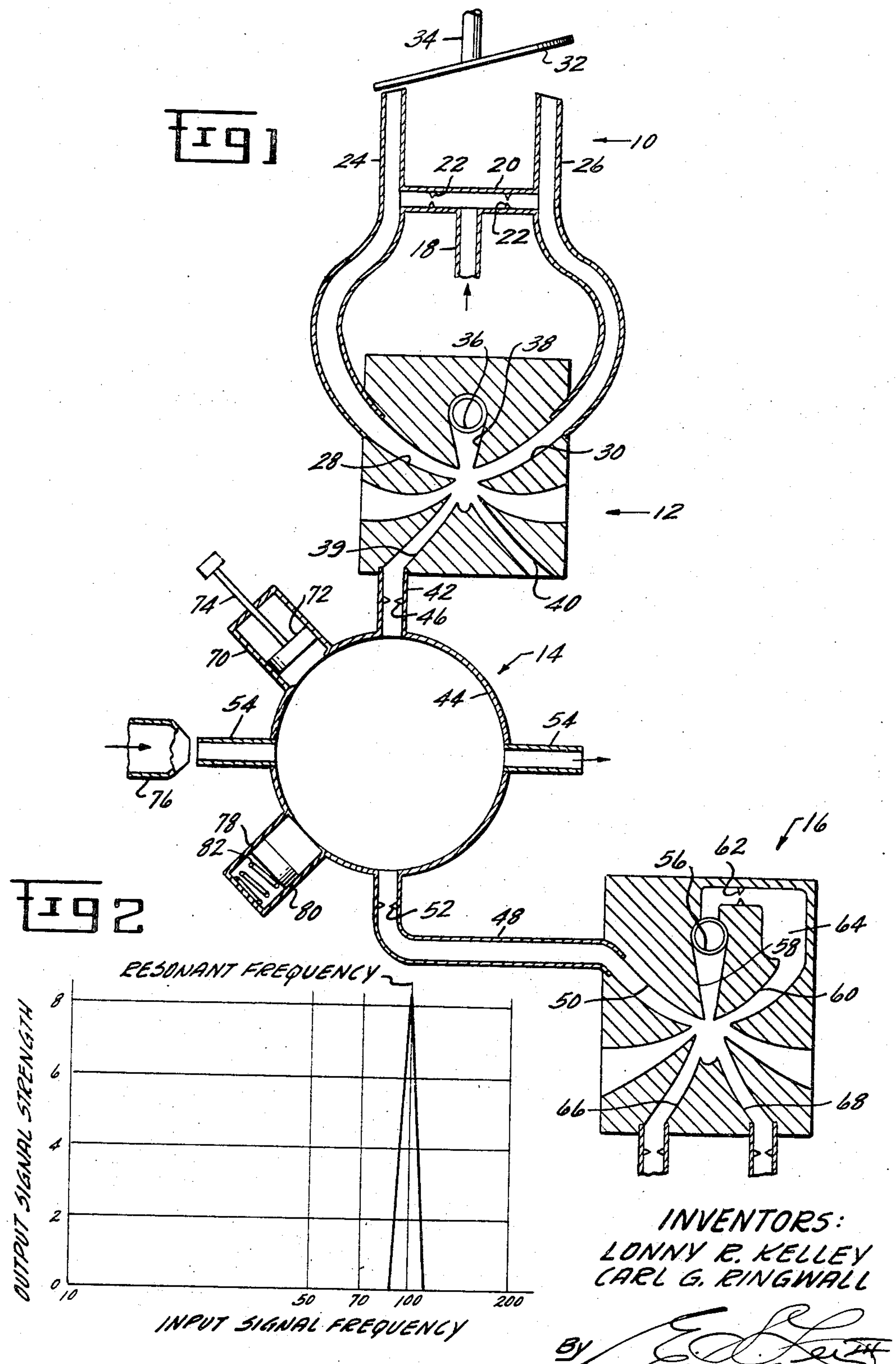
INVENTORS:
LONNY R. KELLEY
CARL G. RINGWALL
BY
ATTORNEY United States Patent Office 3,379,204
Patented Apr. 23, 1968

3,379,204
FLUID SIGNAL RESONATOR CONTROLS
Lonny Ray Kelley, Schenectady, and Carl Gustav Ringwall, Scotia, N.Y., assignors to General Electric Company, a corporation of New York
Filed May 19, 1965, Ser. No. 457,006
2 Claims. (Cl. 137—81.5)

ABSTRACT OF THE DISCLOSURE

The disclosure shows a fluid signal resonator comprising a fluid signal generator utilizing a fluid amplifier. A signal input from the fluid amplifier is fed to the chamber of a resonator. The resonator further comprises open-ended tubes projecting therefrom. The resonator has a resonant frequency which is a function of the volume of the chamber and the length and area of the tubes. When the input signal is at this resonant frequency, a relatively high output signal is provided at an output passageway. The output signal, when the input signal is at the resonant frequency, is also in phase with the input signal and shifts out of phase and is rapidly attenuated when the input signal shifts from the resonant frequency. The resonant frequency of the resonator is also a function of the temperature of the fluid in the chamber and means are provided for passing a given fluid through one tube, the chamber, and out the other tube so that the condition of resonance is an indication of the temperature of the fluid passing through the resonator chamber.

The present invention relates to improvements in fluid control systems employing variable pressure signals and more particularly to improved resonators for establishing signal frequency control parameters.

While many recent improvements have been made in fluid control systems to take advantage of the inherent benefits to be gained such as economy, simplicity, elimination of moving parts, etc., all toward an end of greater accuracy and reliability, there remains a serious need for referencing the frequency of pressure variations in such signals.

Accordingly, one object of the invention is to provide a resonator giving accurate and reliable signal referencing means.

Another need which is fulfilled in accordance with other objects of the invention is that of providing an improved fluid signal control which is a function of fluid temperature.

These ends are obtained by a fluid signal resonator comprising a chamber and an elongated tube extending from the said chamber and having its end open for the unrestricted flow of fluid therethrough. The volume of the chamber and the length and area of the tube have a predetermined relationship establishing a resonant frequency for the fluid within the chamber, which frequency will be also a function of the temperature of this fluid.

Inlet and outlet passageways are provided to and from the chamber. Each of these passageways has a restrictive orifice therein minimizing fluid flow therethrough. A fluid pressure signal generator is connected to the inlet passageway and a signal responsive means is connected to the outlet passageway. The signal responsive means will receive a maximum strength output signal when the input signal from the generator to the inlet passageway is at the preestablished resonant frequency and both input and output signals will be in phase. Variations of the input signal frequency will result in a rapid attenuation of and a phase shift in the output signal. The resultant change in strength and/or phase of the output signal may then be detected by the signal responsive means as a control parameter to modify either the speed of the means operating the signal generator or to control temperature in a desired fashion.

Advantageously a second tube extends from the resonator chamber and has its end open for the unrestricted flow of fluid therethrough. Means are provided for passing fluid into one of these two tubes, through the chamber and out the other tube so that the resonant frequency will be a function of the temperature of the fluid passed through said tubes and chamber and substantially independent of the temperature of the fluid in the inlet and outlet passageways.

It is also preferable to provide means for varying the volume of the chamber to tune the resonant frequency to an exact desired frequency. Further, where liquid is employed as the operating fluid in the chamber, it is preferable that the chamber volume be variable. This characteristic can be had by providing a spring loaded plunger riding in a cylinder which opens onto the chamber.

The above and other related objects and features of the invention will be apparent from a reading of the following description of the disclosure found in the accompanying drawing and the novelty thereof pointed out in the appended claims.

In the drawing:

FIG. 1 is an essentially diagrammatic view of a fluid system embodying the present invention; and FIG. 2 is a plot illustrating an operating characteristic of this system.

FIG. 1 shows a fluid pressure sinusoidal generator 10 driving a proportional amplifier 12 which provides a fluid pressure signal to a resonator 14, embodying the present invention. The output of the resonator 14 is then fed to a second proportional fluid amplifier 16.

The generator 10 comprises a conduit 18 connected to a source of pressurized air. The pressurized air passes to a conduit 20 intermediate equal sized orifices 22, then to conduits 24 and 26. One end of the conduit 24 opens to atmosphere and the other end is connected to a control jet 28 of the amplifier 12. One end of the conduit 26 likewise opens to atmosphere and its other end is connected to a control jet 30 opposed to the control jet 28 in the amplifier 12. A tilted plate 32 is secured to the end of a rotating shaft 34 and overlies the open ends of the conduits 24, 26. As the shaft 34 rotates, the plate 32 wobbles or nutates to alternately and progressively control the escape of air from the conduits 24 and 26 in a sinusoidal fashion. This in turn causes sinusoidal pressure variations in the conduits 24, 26 with the result that the pressures at the control jets 28 and 30 are likewise varying with an equal magnitude and 180° out of phase.

The amplifier 12 also comprises an inlet 36 which is connected to a source of pressurized air so that a power stream is constantly discharged from a power jet 38. The power stream is directed towards receivers 39 and 40 as the power stream is deflected to and fro by the pressure differential of the control jets 28 and 30. Pressure in the receiver 37 thus varies sinusoidally at the same frequency as the rate of rotation of the shaft 34. For present purposes no use is made of the recovered pressure in the receiver 40, and it could in fact be eliminated. However, it does provide a reference signal source which can have utility in certain control circuits.

The recovered pressure in the receiver 39 provides an input signal to the resonator 14. Thus it will be seen that a conduit 42 connects the receiver 39 with a chamber 44 and has a flow restricting orifice 46 therein. The chamber 44 is connected by an outlet conduit or passageway 48 to a control jet 50 in the amplifier 16. An orifice 52 is also provided in the conduit 48. A pair of tubes 54 extend from the chamber 44 and are vented to atmosphere.

The amplifier 16 further comprises an inlet 56 also connected to a source of pressurized fluid to direct a power stream from a power jet 58. A control jet 60 is connected to the source of pressurized air, conveniently at the inlet 56, through an orifice 62 and a capacitive chamber 64. The chamber 64 serves in a known fashion to prevent interaction between the control jets 50 and 60. The orifice 62 controls the pressure of the control jet 60 as later described. The power stream from the jet 58 is directed towards receivers 66 and 68, again in a fashion later described.

It will be apparent that the generator 10 and amplifier 12 provide an input signal to the resonator 14 at the inlet passageway 42, which signal is in the form of a sinusoidally varying pressure. This input signal is transmitted to the chamber 44 and then to the outlet passageway 48 where it is transmitted as an output signal from the resonator to the amplifier 16. The frequency of the input signal determines the strength and phase relationship of the output signal, dependent upon a natural resonant frequency determined by the dimensions of the chamber 44 and tubes 54 and the temperature of the air or fluid therein. When the frequency of the input signal matches this resonant frequency, the columns of air in the tubes 54 vibrate and effectively act as stoppers to prevent the flow of air from the chamber 44. Under these resonant conditions, a maximum signal strength is transmitted from the inlet passageway to the outlet passageway with a minimum of flow through the inlet passageway. The output signal strength is at a maximum and in phase with the input signal. When the input signal frequency varies above or below the natural frequency, the output signal strength falls off very rapidly or is attenuated, as shown in FIG. 2, this being a function of the "Q" of the resonator. A lower Q may be obtained by decreasing the restricting action of the orifices 46, 52. It will also be noted that long narrow passageways could also provide a restrictive action equivalent to these orifices.

The output signal of the resonator is fed to the control jet 50 of the amplifier 16. The orifice 62 is adjusted or selected so that the opposed control jet 60 will have a strength such that with a maximum resonator output signal the power stream from the power jet 58 will create equal output pressures in the receivers 66 and 68.

The natural frequency of the resonator is a function of the volume of the chamber 44 and the length and area of the tubes 54. By changing these relationships the natural resonant frequency can be adjusted. For such purposes a cylinder 70 opens into the chamber 44 and has a piston 72 slidable therein and adjustably positioned by a rod 74 extending through the outer end of the cylinder. Thus it is possible to accurately calibrate the natural resonant frequency of the resonator by displacing piston 72 and changing the volume of chamber 44. It will also be noted that the chamber 44 should have substantial height, width, and depth but need not necessarily be spherical as shown.

Another factor which controls the natural frequency of the resonator is the temperature of the fluid therein. The use of two tubes 54 extending from the resonator is primarily for the purpose of being able to control the natural frequency of the resonator as a function of the temperature of a fluid other than that which is introduced through the inlet passageway 42. The means for accomplishing this end comprise an open ended conduit 76 spaced from one of the tubes 54 in opposed relation thereto. The open ended conduit 76 directs fluid, preferably air or other gaseous fluid, through the adjacent tube 54 through the chamber 44 and discharges it from the other tube 54. It has been found that a continuous flow of fluid through the tubes 54 unexpectedly has no effect on the stoppering action of the vibrating columns of fluid in these tubes as discussed above. The fluid within the chamber 44 may thus be constantly changed and maintained at a desired temperature other than the ambient temperature of the chamber itself. It will be apparent that where it is not desired to constantly change the fluid within the chamber 44, a single tube 54 may be employed.

The preceding description has been directed to the use of air as the fluid in the present device. However, other gases and liquids may be employed. A liquid input signal into the chamber 44 will also cause columns of liquid to vibrate in the tubes 54 to give a resonant effect as previously discussed. In effect these vibrating liquid columns must vary the volume of the chamber. In the previous description of the use of a gaseous working fluid, the fluid itself is compressible. However, since liquid is not compressible, it is necessary to provide an expansion means to accommodate the vibrating water columns. To this end a second cylinder 78 is shown on the chamber 44 with a plunger 80 slidable therein and biased toward the chamber 44 by a spring 82. Thus when a resonant condition is reached, the plunger 80 will reciprocate to accommodate the variation in volume of liquid within the chamber 44.

The sectional views of the amplifiers 12 and 16 will indicate their construction features to those skilled in the art and other variations in constructional details and functional uses of the present invention will also be apparent to such persons so that the scope of the present invention is therefore to be derived solely from the following claims.

Having thus described the invention, what is claimed as novel and desired to be secured by Letters Patent of the United States is:

1. A fluid signal resonator control comprising,
a chamber,
elongated tube means extending from said chamber and open for the unrestricted flow of fluid therethrough,
the volume of said chamber and area of said tube means having a predetermined relationship of resonance at a given frequency which is also a function of the temperature of the fluid in the chamber,
an inlet passageway to and an outlet passageway from said chamber,
each of said passageways having a restrictive orifice therein minimizing fluid flow therethrough,
a fluid pressure signal generator connected to said inlet passageway and providing an inlet signal thereto,
means for passing fluid through said chamber,
whereby the signal-responsive means will receive an output signal of maximum value when the input signal is at said resonant frequency, which resonant frequency reflects the temperature of the fluid being passed through said chamber and both signals will be substantially in phase at said resonant condition, said output signal being rapidly attenuated and phase shifted when said input signal frequency varies from said resonant frequency.

2. A signal fluid resonator control as in claim 1 wherein, the tube means comprise a pair of tubes extending from said chamber and the means for passing fluid through said chamber pass the fluid through one tube and then out the other.

References Cited

UNITED STATES PATENTS

| | | | |
|---|---|---|---|
| 3,185,166 | 5/1965 | Horton et al. | 137—81.5 |
| 3,202,180 | 8/1965 | Gray | 235—201 X |
| 3,228,410 | 1/1966 | Warren et al. | 137—81.5 |
| 3,228,602 | 1/1966 | Boothe | 137—81.5 X |
| 3,233,522 | 2/1966 | Stern | 137—81.5 X |
| 3,238,958 | 3/1966 | Warren et al. | 137—81.5 |
| 3,260,271 | 6/1966 | Katz | 137—81.5 X |
| 3,275,015 | 9/1966 | Meier | 137—81.5 |
| 3,285,262 | 11/1966 | Ernst et al. | 137—81.5 |

M. CARY NELSON, *Primary Examiner.*

S. SCOTT, *Assistant Examiner.*